United States Patent Office 3,238,158
Patented Mar. 1, 1966

3,238,158
RESORCINOL-FORMALDEHYDE COLD-SETTING ADHESIVES AND PROCESS FOR PREPARING SAME
Romeo John Conca, Andrew Beelik, and Franklin W. Herrick, Shelton, Wash., assignors to Rayonier Incorporated, Shelton, Wash., a corporation of Delaware
No Drawing. Filed June 20, 1961, Ser. No. 118,277
2 Claims. (Cl. 260—14)

This invention relates to resorcinol-containing cold-setting adhesive resins, and has for its object the provision of an improved resin composition, and an improved solvent system for such resins.

The invention is based in part on the discovery that the addition of certain dicarboxylic acids to a resorcinol-formaldehyde resin increases the "pot-life," the "open-assembly" tolerance and spreadability, and also makes it practical to substitute a phenol or phenolic material for the more expensive resorcinol. Another important aspect of the invention is based on the discovery of a multi-component solvent system which can effect a material reduction in the resin solids content of the adhesive mixture. We may advantageously use a combination of the dicarboxylic acid and our multicomponent solvent system in various resorcinol-containing adhesive compositions.

Resorcinol-containing, cold-setting adhesives usually are marketed as two components that are stored in separate containers prior to actual use. One component is a resin-base syrup containing a resorcinol-formaldehyde condensate, either used as such or after modification by the addition of phenol or a phenol-formaldehyde condensate, the mole ratio of formaldehyde to resorcinol or resorcinol-phenol being kept below 1 (usually about 0.5 to 0.8). The other component is a hardener made up of a formaldehyde yielding material such as paraformaldehyde mixed with a filler such as wood flour or walnut shell flour. A stabilizer such as methanol may also be included in the resin base syrup component to improve its storage properties or "shelf-life" and to improve the stability or "pot-life" of the adhesive mixture. At the time of use the resin-base syrup and hardener are mixed together in suitable proportions to form the desired adhesive mixture. Such adhesive mixtures when properly prepared and cured provide water-resistant, wood-to-wood joints of great strength that are used in the manufacture of plywood, laminated beams, and many complex wooden forms. Resorcinol-containing, cold-setting adhesive mixtures set up or cure in from 4 to 18 hours under pressures as low as 30 to 40 pounds per square inch at ordinary ambient temperatures forming water-resistant joints that are stronger than the wood itself.

While the foregoing properties of resorcinol-containing, cold-setting adhesives make them attractive, their high cost coupled with a relatively low stability (i.e., pot-life) and short assembly-time tolerance have thus far been serious handicaps to their large scale commercial exploitation.

The problems of limited stability and open-assembly tolerance have been extensively investigated in the past, particularly when part of the resorcinol has been replaced by other simple phenols. When the resin-base syrup and the hardener are mixed together for use, the formaldehyde in or released by the hardener starts to react with the phenolic components of the adhesive, slowly condensing (i.e., curing) them even at room temperatures. The condensation process, of course, increases the viscosity of the adhesive mixture, gradually at first and then more and more rapidly until eventually it passes the point of spreadability and solidifies (i.e., cures) into an insoluble, infusible mass. Many stabilizers have been added to the adhesive to slow down the rate of condensation and thereby extend the stability or pot-life but with only indifferent success. The most commonly used stabilizers have been methanol and acetone. Both will appreciably extend the pot-life of the adhesive but both being extremely volatile also severely shorten the open-assembly time tolerance and adversely affect the spreadability of the mixture. As a result they have not resulted in a satisfactory solution to the problem.

In order to lower the cost of the adhesive, a substantial portion of the resorcinol (the most costly ingredient) may be replaced by a less costly phenol and/or a phenolic product such as an alkaline extract of a coniferous bark or a quebracho extract. A particularly effective bark extract is the one described in United States Patent 2,819,295. Adhesives containing phenol and/or bark or quebracho extracts perform satisfactorily from the standpoints of bonding strength and water-resistance but their overall stability and open-assembly tolerances have been adversely affected in the past. For example, the pot-life (herein defined as the time required for the viscosity of the adhesive mixture to advance to the point of non-spreadability or about 1000 poises) can drop from say four hours to as low as 20 to 30 minutes and open-assembly tolerance (herein defined as the interval following spreading the adhesive during which the adhesive film retains the ability to yield satisfactory bonding) can drop from say about 30 to 60 minutes to as low as 5 minutes when using glue spreads of about 65 lbs./M s.g.i. (thousand square feet of glue line) and ambient temperatures. As a result, resorcinol-containing cold-setting adhesives in which a portion of the resorcinol has been replaced with bark or quebracho extracts have not found use in the production of laminated means or complex forms such as boat hulls, etc., where substantial stability and open-assembly tolerance are required.

We have discovered that the addition of a small amount of a dicarboxylic acid selected from the group consisting of maleic, oxalic, succinic, phthalic, terephthalic and citric acids will effectively lengthen the pot-life of a resorcinol-containing, cold-setting adhesive resin and improves open assembly tolerance, spreadability, etc., regardless of whether a portion of the resorcinol has been replaced with other simple polymeric phenolic materials or not. Of the group, maleic, oxalic and phthalic acids are preferred and from 1 to 6 percent of the same, based on the weight of the phenolic material present, will increase the pot-life of the adhesive up to several hundred percent.

We have also discovered a multi-component solvent system for dissolving resorcinol-formaldehyde cold setting adhesives which will permit a reduction in the total resin solids content of the adhesive mixture by as much as 50 percent without adverse effect on the properties of either the adhesive mixture itself or the quality of the cured joints prepared using it. Moreover, our multi-component solvent system coupled with the addition of a small amount of the dicarboxylic acids will overcome the adverse effects of polymeric phenolic materials such as alkaline bark extracts and quebracho extracts on the stability and open-assembly tolerance of resorcinol-containing, cold-setting adhesives, and will also permit a reduction in the solids content.

The resorcinol-containing, cold-setting adhesives of commerce heretofore have been formulated to contain from 50 to 60 percent of resin solids. We have discovered that by dissolving the resin solids in a multi-component system of solvents consisting of a dilute aqueous solution of a high viscosity CMC (carboxymethylcellulose), ethylene glycol and either acetone or methanol the resin solids content of the adhesive mixture can be reduced as much as 50 percent without adverse effect on the adhesive mixture or the joints prepared therewith. This, of course, materially reduces the cost per square foot of surface glued. The solvent components of our multi-component solvent system should be present in a weight ration of from about 40 to 70 percent aqueous CMC solution (from 0.5 to 2.0 percent CMC), 20 to 50 percent ethylene glycol and the balance of from 0 to 30 percent, acetone or methanol. A particularly effective system will contain about 60 percent of 1 to 1.5 percent high viscosity CMC solution, 30 percent ethylene glycol and 10 percent acetone or methanol. Our multi-component system of solvents has a number of important advantages. The solvents greatly increase the open-assembly tolerance of the adhesive mixture. The CMC acts as a "viscolizer" substantially increasing the body and viscosity of the adhesive mixture and thereby enabling it to be spread more easily and evenly without shortening its pot-life. Furthermore, the CMC acts as a buffer and protective colloid for the adhesive mixture, inhibiting evaporation of volatile solvents and migration of resin solids into the wood and away from the glue line, a result that leads to starved, weak joints.

The following examples illustrate the invention in more detail. The stability (i.e., pot-life) determinations therein were made by placing a sample of the freshly prepared adhesive mixture in a bottle and setting it in a thermostatically controlled water bath at 20° C. Brookfield viscosities were then run on the adhesive mixture at appropriate intervals until its viscosity had risen to 1000 poises. The elapsed time at this point was recorded as pot-life. Adhesive bond quality was determined by preparing two-ply laminates using kiln-dried, vertical grain 1 x 10 inch Douglas fir boards. The boards were sawn to give pieces for testing that were 8 inches long in the grain direction. These were sanded just prior to gluing. The amount of adhesive to give the desired glue-spread was weighed onto the wood surfaces and evenly spread with a rubber roller that had been equilibrated with the adhesive. The adhesive coated boards were fully exposed to the atmosphere (open assembly) for a specified length of time. Laminates were then formed by placing the spread surfaces of the boards together with the grain running in the same direction. They were then clamped together in portable clamps in which the desired pressure was attained by means of a recording torque wrench or by placing them in a hydraulic press. Pressure was maintained for 16 hours at 175 p.s.i. and at ambient temperatures ranging from about 70 to 78° F. After pressing the laminates were conditioned at room temperature for 6 additional days to develop maximum adhesive strength.

After the laminate samples were cured as indicated, they were cut into 20 block shear specimens having a 1.5 square inch adhesive bond area. Ten specimens were broken dry and 10 wet for each recorded value, the breaking loads and estimated percent wood failure being averaged. Prior to breaking, the wet specimens were soaked for 48 hours in water at room temperature, dried 8 hours at 60° C., resoaked 16 hours at room temperature, redried 8 hours at 60° C., and finally given a third 16 hour soak at room temperature. Compression-shear strengths were determined using a Tinius Olsen Universal testing machine operated at a head speed of 0.05 inch per minute.

*Example 1*

A resorcinol-formaldehyde condensate to be used in the adhesive compositions prepared by the methods of this invention can conveniently be prepared as follows. A vessel equipped with an efficient agitator, provision for heating, reflux condenser and a temperature-sensing element is charged with 110 parts of technical-grade resorcinol, 22 parts of water and 22 parts of 37% aqueous formaldehyde. The agitated mixture is brought to, and maintained, for 15 minutes at reflux temperature, then further 33 parts of 37% formaldehyde is added over a period of 5 minutes and refluxing is continued for an additional 25 minutes. The reaction mixture is finally cooled to 25° C. The condensate has a solids content of 65% and a viscosity of 750 centipoises.

*Example 2*

The results in Table 1 illustrate the improvement in glue mixture stability (pot-life) and bonding power obtained when the process of our invention is used in the preparation of cold-setting adhesives. In these adhesives, a substantial portion of the resorcinol content has been replaced with an alkaline bark extract, and the total solids content was lowered from the customary 50–60% to 30% by incorporation of the novel multi-component solvent mixture of our invention. Hemlock bark was extracted with aqueous ammonia, and the ammonia in the extract was replaced with sodium by the methods set out in United States Patent 2,819,295 to obtain the bark extract used in these adhesives. The resorcinol-containing component was either the resorcinol-formaldehyde condensate described in Example 1, or a commercial straight resorcinol-formaldehyde resin of essentially the same mole ratio of formaldehyde to resorcinol, or a commercial phenol-modified resorcinol-formaldehyde resin. The solid substance of the resorcinol-formaldehyde condensate, or resins, consisted of about 85% resorcinol and 15% formaldehyde by weight; that of the phenol-resorcinol-formaldehyde resins of approximately 44% resorcinol, 38% phenol, and 18% formaldehyde corresponding to mole ratios of 1:1 of phenol to resorcinol and 0.8:1 formaldehyde to phenol plus resorcinol. The commercial resins employed were: Penacolite G–1131A, with 59% T.S., 6000 Plyophen, with 55% T.S., and Resorsabond 2621, with 59% T.S., all three straight resorcinol-formaldehyde resins; and also Resorsabond 2600, with 59% T.S., also a phenol-resorcinol-formaldehyde resin.

Using these materials, the ten adhesives listed in Table 1 were prepared as follows: 80 grams of bark extract (75 grams oven dry) was added to a stirred mixture of 89 grams of ethylene glycol and 30 grams of acetone. To this mixture was added, in sequence, 174 grams of 1.0% aqueous CMC, and 127 grams of one of the resorcinol-containing resins (75 grams resin solids). Each composition was prepared in duplicate; to one portion nothing further was added, to the other, 7.5 grams of powdered maleic anhydride, the most conveniently available form of maleic acid. All mixtures were stirred thoroughly for 10 minutes. These proportions were calculated for, and used with, the three resins of 59% T.S. For the two others the resin quantities were adjusted to maintain the resin solids weight at 75 grams, which in turn required adjustment of the solvent quantities to maintain the total solids content of the mixture of bark extract, resin and solvents at 30%.

Adhesive mixtures were finally formed by intimately mixing 100 grams of each of the ten liquid adhesive components with 12 grams of a hardener composed of 20 parts of paraformaldehyde and 25 parts of walnut shell flour. Douglas fir laminates were prepared with each adhesive mixture, using a glue spread of 65 lbs./M s.g.l., an open assembly time of 30 minutes, and an ambient curing temperature of 75° F. The results of the evaluation are given in Table 1.

TABLE 1

| Resin | Percent maleic acid [a] | Pot life at 20° C., hrs. | Bonding strength (p.s.i./percent wood failure) | |
|---|---|---|---|---|
| | | | Dry | Cold soak |
| Resorcinol-formaldehyde | 0.0 | 2.0 | 1,357/88 | 793/75 |
| Condensate (RF) | 10.0 | 6.0 | 1,961/90 | 1,108/80 |
| Penacolite | 0.0 | 2.0 | 1,450/70 | 628/84 |
| G-1131A (RF) | 10.0 | 5.0 | 1,732/88 | 906/89 |
| 6000 | 0.0 | 1.5 | 1,249/82 | 601/71 |
| Plyophen (RF) | 10.0 | 4.0 | 1,175/92 | 611/95 |
| Resorsabond | 0.0 | 1.5 | 1,653/87 | 841/96 |
| 2621 (RF) | 10.0 | 4.0 | 1,496/92 | 632/100 |
| Resorsabond | 0.0 | 1.8 | 1,339/75 | 711/77 |
| 2600 (PRF) | 10.0 | 5.0 | 2,034/80 | 989/77 |

[a] Percentage of bark extract solids.

*Example 3*

The results in Table 2 illustrate the superiority of maleic acid over other organic and inorganic acids when used as a corrective additive in adhesive compositions prepared from an alkaline bark extract, a commercial resorcinol-containing resin, and the multi-component solvent system of our invention. The bark extract and the solvent system used here were the same as those used in Example 2. The commercial resin was Penacolite G-1288A, with 56% T.S., which is a phenol-modified resorcinol-formaldehyde (PRF) resin. The five adhesives listed in Table 2 were prepared in the following manner:

80 grams of the bark extract (75 grams oven dry) were added to a stirred mixture of 87 grams of ethylene glycol and 29 grams of acetone. To this mixture was added in sequence, 169 grams of aqueous solution (1.0%) of CMC, 134 grams of the foregoing Penacolite G-1288A (75 grams of resin solids) and sufficient acid to lower the pH of the mixture to from 8.5 to 9.0. (The maleic acid was added as the anhydride for convenience.) Adhesives were then formed by stirring in 12 grams of a hardener (which was prepared by mixing 200 parts of paraformaldehyde with 250 parts walnut shell flour) for each 100 grams of the resin base. In preparing the laminates, an open-assembly time of 20 minutes at 75° F. was used and the glue-spread was 65 lbs./M s.g.l.

TABLE 2

| Acid used | Percent [a] | Liquid adhesive component, pH | Glue mixture | | |
|---|---|---|---|---|---|
| | | | Pot-life at 20° C., hours | Bonding strength (p.s.i./percent wood failure) | |
| | | | | Dry | Cold soak |
| None (Control) | | 9.7 | 1.5 | 1,453/98 | 768/96 |
| Hydrochloric | 3.8 | 8.8 | 2.0 | 1,447/81 | 893/67 |
| Fumaric | 10.0 | 8.5 | 1.0 | 947/72 | 86/71 |
| Formic | 5.4 | 8.7 | 2.0 | 1,507/92 | 931/61 |
| Maleic | 10.0 | 8.8 | 7.0 | 1,031/87 | 983/66 |

[a] Based on the weight of alkaline bark extract solids.

The difference in the effect of the two dicarboxylic acids maleic and fumaric on the stability of the adhesive mixture is rather surprising. The maleic acid gives better than a 4-fold increase in pot-life while its isomer, fumaric acid, actually decreases it under substantially identical conditions. The reason for this is not known but is believed to be related to their steric conformations.

*Example 4*

The adhesives listed in Table 3 were prepared in the manner outlined in Example 2, except that the alkaline hemlock bark extract was replaced with one or the other of two quebracho wood extracts. One of the quebracho extracts was of the "ordinary," or unsulfited type, the other was of the "clarified," or partially sulfited type. By analysis, the clarified quebracho sample was found to contain 2.7% sulfur, corresponding to about 8.7% sodium bisulfite, which is quite comparable to the usual practice of treating quebracho extract with about 8% sodium bisulfite during the clarification process. Appropriate amounts of sodium hydroxide were used in conjunction with the quebracho extracts to make them comparable, in this respect, to the alkaline hemlock bark extracts. The commercial resins used in this example were Cascophen RS-216, a resorcinol-formaldehyde resin, and Cascophen RS-240MD, a phenol-resorcinol-formaldehyde resin. The solvent mixture and additives used were the same as in Example 2.

36.4 grams of quebracho extract (32 grams oven dry) and 6.4 grams of sodium hydroxide were added to a stirred mixture of 48.6 grams of ethylene glycol and 16.2 grams of acetone. To this mixture was added first 92.8 grams of a 1.5% aqueous solution of high-viscosity CMC, then 99.6 grams of Cascophen RS-216 (57.6 grams of resin solids) and finally 3.8 grams of powdered maleic anhydride. One hundred grams of the liquid component thus prepared was thoroughly mixed with 12.8 grams of a hardener, consisting of 20 parts of paraformaldehyde and 25 parts of super-fine wood flour, to give the glue mixture. In preparing the laminates from freshly-planed nominal 2 x 6 inch Douglas fir lumber, a glue spread of 85 lbs./M s.g.l., an assembly time of 2 hours (1 hour open, 1 hour closed assembly), and an ambient curing temperature of 75° F. was used.

TABLE 3

| Liquid adhesive component | | | Glue mixture | | |
|---|---|---|---|---|---|
| Quebracho extract | Commercial resin | pH | Pot-life at 20° C., hours | Bonding strength (p.s.i./percent wood failure) | |
| | | | | Dry | Cold soak |
| Ordinary | RS-216 | 9.0 | 5.7 | 1,371/97 | 1,139/93 |
| Do | RS-240MD | 9.3 | 5.0 | 1,305/99 | 1,123/100 |
| Clarified | RS-240MD | 9.4 | 5.0 | 1,379/98 | 1,025/97 |

*Example 5*

The results in Table 4 illustrate the effectiveness of the process of the present invention with respect to increasing the tolerance of the resorcinol-containing, cold-setting adhesives towards open-assembly. The five adhesives listed in the table were prepared as follows:

(A) This adhesive mixture was prepared from said Resorsabond 2600, and the preparation and use followed specifications of the manufacturer exactly.

(B) This adhesive mixture was prepared using the same resin as in (A) and the alkaline bark extract of Example 2. It was prepared and tested in exactly the same manner as the adhesives set out in Example 2, except that the amount of alkaline bark extract was reduced to provide a ratio of bark extract solids to Resorsabond 2600 solids of 0.5:1 instead of 1:1. No dicarboxylic acid was added to this adhesive sample.

(C) This adhesive mixture was prepared using the same ingredients as in adhesive (B) and in the same manner except that 10 percent maleic acid in the form of the anhydride (based on the weight of the bark extract solids) was added.

(D) This adhesive mixture was exactly the same as adhesive mixture (C) except that a stoichiometrically equivalent amount of phthalic acid was substituted for the maleic acid.

(E) This adhesive mixture was also exactly the same as adhesive mixture (C) except that in this case a stoichiometrically equivalent amount of oxalic acid was substituted for the maleic acid.

These five adhesive mixtures were tested by the indicated methods on Douglas fir boards. The glue-spread was 85 lbs./M s.g.l. and the open-assembly time 100 minutes at 75° F. in each case. It is interesting to note that the total resin solids content of adhesive mixture (A) was 58 percent and that of adhesive mixtures (B), (C), (D) and (E) was only 30 percent yet the results obtained by (C), (D) and (E), the adhesive mixtures of the present invention, were superior.

TABLE 4

| Adhesive | pH | Pot-life at 20° C., hours | Bonding strength (p.s.i./percent wood failure) | |
|---|---|---|---|---|
| | | | Dry | Cold soak |
| (A) | 7.4 | 7.5 | 1,016/69 | 487/54 |
| (B) | 8.7 | 2.9 | 843/28 | 131/6 |
| (C) | 7.9 | 7.0 | 1,115/95 | 613/100 |
| (D) | 8.1 | 9.5 | 1,244/86 | 693/93 |
| (E) | 8.0 | 6.0 | 1,451/100 | 901/100 |

*Example 6*

Higher viscosities and heavier bodies are generally preferred in adhesives used for the lamination of heavy structures such as timbers and in other applications. It is easily possible to vary this property of the adhesive in the process of our invention by suitable modification of the solvent system within the indicated limits. This can be done without any adverse effect on the other properties of either the adhesive mixture or the quality of the adhesive bonds. Several modifications designed to provide various adhesive viscosity levels are illustrated in Table 5.

The adhesives listed in Table 5 were prepared in the same manner as those in Example 2. In other words, a portion of an alkaline bark extract was mixed with sufficient ethylene glycol and either acetone or methanol so that these solvents would be present in the adhesive mixture in the proportions of 30 and 10 percent of the total added solvent, respectively. To this mixture was added sufficient water or dilute aqueous CMC solution (as the case might be) to be equivalent to the remaining 60 percent of the solvent so added. Then sufficient Resorsabond 2600 (previously described) was stirred in to bring the ratio of bark extract solids to Resorsabond solids to 0.67:1. The total solids content of this mixture was 30 percent. Maleic anhydride equivalent to 10 percent of the weight of the bark extract solids was then added and finally the hardener which in this case contained "superfine" wood flour filler. The glue-spread in each case was 65 lbs./M s.g.l., the open-assembly time 30 minutes and the closed-assembly time 30 minutes. The laminates were pressed, cured and tested as before. The variations in the solvent systems used were as follows:

(A) Water:ethylene glycol:acetone in a weight ratio of 60:30:10.

(B) 1 percent aqueous CMC solution:ethylene glycol:acetone in a weight ratio of 60:30:10.

(C) 1.3 percent aqueous CMC solution:ethylene glycol:acetone in a weight ratio of 60:30:10.

(D) 1.3 percent aqueous CMC solution:ethylene glycol:methanol in a weight ratio of 60:30:10.

(E) 1.5 percent aqueous CMC solution:ethylene glycol:acetone in a weight ratio of 60:30:.10.

(F) 1.5 percent aqueous CMC solution:ethylene glycol:methanol in a weight ratio of 60:30:10.

TABLE 5

| Adhesive | Viscosity at 20° C., poises | Pot-life at 20° C., hours | Bonding strength (p.s.i./percent wood failure) | |
|---|---|---|---|---|
| | | | Dry | Cold soak |
| (A) | 12.0 | 7.4 | 1,298/17 | 861/58 |
| (B) | 27.0 | 6.0 | 1,188/90 | 546/100 |
| (C) | 34.8 | 8.0 | 1,190/98 | 465/78 |
| (D) | 44.0 | 7.3 | 1,271/97 | 674/87 |
| (E) | 36.4 | 9.3 | 1,365/84 | 881/93 |
| (F) | 50.4 | 10.0 | 1,369/92 | 976/83 |

*Example 7*

While dicarboxylic acids of the present invention have their greatest utility in controlling the pH and pot-life of cold-setting adhesive mixtures wherein a portion of the resorcinol has been replaced with a bark extract, they are also surprisingly effective in other types of resin formulations. For example, an adhesive mixture prepared using Penacolite G-1292A, a phenol-modified, resorcinol-formaldehyde adhesive resin was found to have a pot-life at 20° C. of only 2 hours and a pH of 9.2 when prepared according to directions. When the pH was adjusted to 7.8 with either acetic acid or hydrochloric acid the pot-life at 20° C. increased to 3.5 hours. When the pH was adjusted to 7.8 with maleic acid, however, the pot-life increased to 7.7 hours, without impairment of the bonding properties of the adhesive.

*Example 8*

One of the surprising advantages of the multi-component solvent system of our invention is its effectiveness in lowering the total resin solids content required in adhesive mixtures. Commercial resins heretofore have been supplied to have a total solids content of about 45 to 60 percent in the liquid adhesive component. Our multi-component solvent system reduces this requirement to around 30 percent without any impairment whatsoever in the bonding properties, etc., as obtained. This is clearly demonstrated by the results listed in Table 6.

To obtain the results in Table 6, two adhesive mixtures were prepared and tested for each commercial resin, one following the instructions of the manufacturer exactly, and the other after dilution of the resin base to a solids content of 30 percent with the multi-component solvent system of Example 2. Glue-spreads were at the rate of 85 lbs./M s.g.l. and open-assembly times were 75 minutes at 75° F. in every case. The commercial resins used were the following:

(A) Cascophene Lt–68D, a phenol-modified resorcinol-formaldehyde resin.

(B) 6000 Plyophen, a resorcinol-formaldehyde resin.

(C) RF 900, a resorcinol-formaldehyde resin.

TABLE 6

| Liquid adhesive components | | | Glue mixture | | | |
|---|---|---|---|---|---|---|
| Brand | Diluted | Total solids, percent | Visc. 20° C., poises | Pot-life 20° C., hours | Bonding strength (p.s.i./percent wood failure) | |
| | | | | | Dry | Cold soak |
| (A) | No | 53 | 66.0 | 4.0 | 1,436/85 | 824/95 |
| (A) | Yes | 30 | 1.0 | 8.8 | 1,266/97 | 726/92 |
| (B) | No | 55 | 37.0 | 4.0 | 661/47 | 348/33 |
| (B) | Yes | 30 | 0.7 | 6.5 | 1,179/95 | 820/90 |
| (C) | No | 48 | 80.0 | 5.5 | (¹) | (¹) |
| (C) | Yes | 30 | 0.7 | 9.0 | 1,274/86 | 1,178/84 |

¹ Dry—No bonding.

Example 9

It was pointed out in Example 6 that the viscosity of the adhesive mixture could be regulated by suitable modifications in the composition of the multi-component solvent system used, without harming bonding properties, stability, etc. The adhesive mixtures of Example 6 all contained both a bark extract and a dicarboxylic acid. The same viscosity regulation is also possible in their absence as shown in Table 7.

The adhesive mixtures set out in Table 7 are all based on Cascophen RS–216, a resorcinol-formaldehyde resin base. They were prepared for use as follows:

(A) This adhesive mixture was the one recommended by the manufacturer. The total solids content of the liquid component was 58 percent.

(B) This adhesive mixture was prepared by diluting the resin base to a total solids content of 30 percent with 1% aqueous CMC solution:ethylene glycol:acetone in a weight ratio of 60:30:10. Walnut shell flour was used as the filler in the hardener.

(C) This adhesive mixture was prepared by diluting the resin base to a total solids content of 30 percent with 1.5% aqueous CMC solution:ethylene glycol:acetone in a weight ratio of 60:30:10. The hardener contained walnut shell flour as filler.

(D) This adhesive mixture was prepared in exactly the same manner as adhesive mixture (C), except that the hardener contained "super-fine" wood flour as filler.

TABLE 7

| Adhesive mixture | Viscosity 20° C., poises | Pot-life 20° C., hours | Bonding strength (p.s.i./percent wood failure) | |
|---|---|---|---|---|
| | | | Dry | Cold soak |
| (A) | 26.4 | 6.0 | 1,310/95 | 803/100 |
| (B) | 3.2 | 13.5 | 1,461/98 | 941/93 |
| (C) | 17.2 | 16.0 | 1,449/92 | 1,041/91 |
| (D) | 28.0 | 14.1 | 1,567/99 | 846/100 |

We claim:

1. A cold-setting adhesive composition comprising a resorcinol-formaldehyde resin, a phenolic material of the group consisting of an extract of quebracho and an alkaline digestion product of a coniferous bark, said composition being in solution in a multi-component solvent system comprising from 40 to 70% of an aqueous 0.5 to 2.0% solution of carboxymethylcellulose, from 20 to 50% of ethylene glycol and up to 30% of a compound of the group consisting of acetone and methanol, said percentages being in parts by weight, said solution including from 1 to 6% by weight based on the phenolic material of a dicarboxylic acid of the group consisting of maleic, oxalic, succinic, phthalic, terephthalic, and citric acids.

2. The process for producing a cold-setting adhesive composition which comprises providing an alkaline solution of a resorcinol-formaldehyde resin dissolved in a solvent mixture consisting of from 40 to 70% of an aqueous 0.5 to 2.0% carboxymethylcellulose solution, from 20 to 50% of ethylene glycol, and up to 30% of a compound of the group consisting of acetone and methanol said solvent mixture also containing a polyphenolic material of the group consisting of an alkaline bark extract of coniferous trees and quebracho extract and adding thereto from 1 to 6% based on the total phenolic material of a dicarboxylic acid of the group consisting of maleic, oxalic, succinic, phthalic, terephthalic and citric acids.

References Cited by the Examiner

UNITED STATES PATENTS

| | | | |
|---|---|---|---|
| 1,802,390 | 4/1931 | Novotny | 260—54 |
| 2,414,415 | 1/1947 | Rhodes | 260—29.3 |
| 2,462,253 | 2/1949 | Booty | 260—14 |
| 2,488,495 | 11/1949 | Malashevitz | 260—54 |
| 2,582,228 | 1/1952 | Brinkema | 60—54 |
| 2,862,897 | 12/1958 | Barrentine et al. | 260—14 |
| 3,025,250 | 3/1962 | Herrick et al. | 260—29.3 |

OTHER REFERENCES

Ott et al., High Polymer Series, vol. V, 2nd Edition, pages 1020 and 1468.

JOSEPH L. SCHOFER, *Primary Examiner.*

WILLIAM SHORT, *Examiner.*